United States Patent [19]

Lincoln et al.

[11] 3,864,644
[45] Feb. 4, 1975

[54] DYE LASERS INCLUDING RIGIDIZED CARBOCYANINE DYES

[75] Inventors: Lewis Lauren Lincoln; Donald Warren Heseltine, both of Rochester, N.Y.

[73] Assignee: Eastman Kodak Company, Rochester, N.Y.

[22] Filed: Oct. 10, 1972

[21] Appl. No.: 296,476

Related U.S. Application Data

[63] Continuation-in-part of Ser. No. 126,988, March 22, 1971, abandoned.

[52] U.S. Cl... 331/94.5 L, 252/301.2 R, 260/283 S, 260/286 Q, 260/288 R, 260/294.8 A, 260/296 P
[51] Int. Cl............................................. H01s 3/00
[58] Field of Search............. 252/301.2 R; 331/94.5

[56] References Cited
UNITED STATES PATENTS

| | | | |
|---|---|---|---|
| 3,521,187 | 7/1970 | Snavely........................ | 252/301.2 R |
| 3,541,470 | 11/1970 | Lankard et al............... | 252/301.2 R |

OTHER PUBLICATIONS

Bass et al., Lasers, Marcel Dekker, Inc., N.Y., N.Y., 1971, Vol. 3, p. 269–272, 278–284.
Lepicki et al., Lasers, Marcel Dekker Inc., N.Y., N.Y., 1966 Vol. 1, pp. 186, 196, 197, 240, 246.
Sorokin, Scien. Am. 220 (1969), pp. 30, 33–40.

*Primary Examiner*—Arthur P. Demers
*Attorney, Agent, or Firm*—M. R. Chipaloski

[57] ABSTRACT

Rigidized carbocyanine dyes including at least two nitrogen-contaiing heterocyclic nuclei with a nitrogen atom of each nucleus joined by a 5 carbon polyene chain, each heterocyclic nucleus also having the non-metallic atoms to complete, in combination with the two nitrogen atoms and the carbon atoms of the intervening polyene chain, a nucleus which is either 3,4,5a-,6,7,8-hexahydro-4aH-pyrano[3,2-c;-5,6-c' dipyridine or an analog wherein the member in the 5-position is alternatively one such as a sulfur atom, a nitrogen atom, a selenium atom, etc., are useful as laser dyes in dye lasers. The dye laser generally includes a reservoir means for containing a laser dye solution and a pumping energy source capable of producing stimulated emission of the laser dye solution which itself includes a lasing concentration of the laser dye in a non-interfering solvent.

6 Claims, No Drawings

DYE LASERS INCLUDING RIGIDIZED CARBOCYANINE DYES

This is a Continuation-in-Part of U.S. Ser. No. 126,988, filed Mar. 22, 1971 now abandoned.

This invention relates to lasers and particularly to organic dye lasers and to the use therein of certain rigidized carbocyanine dyes that are capable of lasing when properly excited.

Lasers (acronym for light amplification by stimulated emission radiation) or optical masers (acronym for microwave amplification by stimulated emission radiation) are light amplifying devices which produce high intensity pulses of coherent monochromatic light concentrated in a well collimated beam commonly called a laser beam. There are several uses for such laser beams. Since the beam can be sharply focused, it can produce energy densities suitable for drilling, welding, cutting, etc. One potential application of laser beams is in the field of communications where the optical spectrum represents almost limitless bandwidth and information carrying capacity.

It is desirable to have lasers which are operable at many different wavelengths in the light spectrum including infrared, visible and ultraviolet regions. Since the wavelength emitted by a specific energy transition in a laser medium is tunable over only a small portion of the spectrum, it is necessary to provide a number of materials adapted for use as active laser media at various light frequencies. Many of the materials discovered thus far which are capable of acting as laser media have been in the solid and gaseous states. It is also known that certain organic dyes in solution can operate as "liquid" or "organic dye" lasers. Of the range of materials useful as lasing media, organic lasing dyes provide certain advantages. A wide range of organic dye lasers is available to provide stimulated emission (lasing) over a broad range of spectrum. Secondly, organic dye lasers are generally capable of being tuned to emit over a range of wavelengths, this being in contradistinction to the essentially single wavelength capability of lasing emission characterizing gas and solid lasers. Thirdly, organic dye lasers provide an economical lasing medium when compared to gas and solid lasers, and they do not suffer from disadvantages such as cracking and optical imperfections that are particularly associated with solid lasers.

The ability to selectively tune organic dye lasers derives from the broad band fluorescence characteristic of the component dye. Such lasers can be "tuned" to emit at wavelengths along substantially the entire fluorescence band of the dye by interposing a dispersive element, such as a diffraction grating or a prism.

The operation of a laser is achieved as a result of the phenomenon that excited atoms or molecules can emit a photon or quantum of light, which photon or quantum can itself trigger another excited atom or molecule to emit its photon prematurely. This process is designated stimulated emission.

The excitation of organic lasing dyes can be achieved by subjecting the dye, under controlled conditions such as will be described herein, to a suitable source of energy such as bombarding it with electrons or illuminating it with a high energy source. Conventionally, illumination is utilized for liquid laser materials. Excitation of a liquid laser medium by illumination is generally termed "optical pumping" or merely "pumping". Pumping sources include, for example, sources such as giant pulse lasers, xenon and argon arc flash tubes as well as arc discharge tubes containing only air or other gaseous mixtures.

Various arrangements of laser apparatus can be used. A laser structure particularly adapted for organic dye liquid laser media is described by Sorokin et al., *IBM Journal*, v. 11, p. 148 (1967). Advantageous laser apparatus structures usually include an optically resonant cavity containing a reservoir of a liquid laser medium or a liquid laser body disposed within a thin-walled quartz cylinder. Typically, the reservoir is part of a closed system through which the dye solution is circulated during lasing operation. Thus, localized heating which can cause refractive discontinuities and potential breakdown of the dye is effectively prevented. To provide an energy source for exciting the atoms of the laser material, the laser body can be surrounded concentrically by a lamp, such as one containing an annular region within an outer thick-walled quartz cylinder. The annular region can contain an air-argon mixture and have electrodes which are operably connected to a low inductance capacitor charged by a standard high voltage supply. Desirably coaxially disposed at either end of the optically resonant cavity are opposed internally reflective cavity ends such as mirrors.

When optical pumping is used, the light source is adapted to emit a pulse of pumping light including light having wavelengths falling within at least one absorption band of the laser material contained within the reservoir. Molecular electrons exist either in a singlet state (two electrons spinning in opposite directions) or a triplet state (two electrons spinning in the same direction). The ground state is the unexcited state for molecular electrons and has the lowest energy. Typically, the ground state in almost all molecules is a singlet (designated $S^o$), one of many possible energy levels in the singlet state. When the pumping source is activated, the resultant light pulse enters the laser body and photons of energy of appropriate absorptive wavelength are absorbed by active molecules in the body and cause the electrons of such molecules to shift from an initial low energy level ($S^o$) to a high energy level from which emissive transition occurs.

In operation, the molecular electrons of the laser medium are desirably pumped to higher excited states of the singlet system by intense energy inputs. It is thought that they then first undergo transitions from such excited states to the lowest excited state (designated $S^1$). After diminishing in energy level to the lowest excited singlet, the molecule can relinquish its remaining excess energy radiatively or non-radiatively from $S^1$ to $S^o$, non-radiatively from $S^1$ to a triplet state and then radiatively or non-radiatively from the lowest excited triplet state to $S^o$. Generally, laser emission consists of optical emission resulting from transitions from $S^1$ to various vibrational modes of $S^o$. Susceptibility to triplet formation upon pumping is deleterious due to typical non-radiative energy losses resulting from triplet to $S^o$ transitions. Also, if there is significant overlap between the triplet absorption and either the pump bands or lasing emission bands, laser action generally will be impeded or will fail entirely. Additionally, advantageous laser emission can occur only when the population of molecules established at this higher energy level in the laser body by such light pumping exceeds the population of molecules remaining at the initial low energy level, a condition conventionally designated "population inversion" or "inversion of energy states."

Upon reaching an inversion of energy states, individual molecules of the high energy level population undergo emissive transition spontaneously, shifting to a terminal low energy level as described herein with a concomitant emission of light. A portion of the spontaneously emitted light is usually reflected back and forth through a resonant optical cavity structure, such as previously described, between its internally reflective ends. As this light passes through the laser body in multiple bidirectional reflections, it induces other molecules of the enlarged high energy level population to undergo premature light emissive transitions as noted herein. This produces more light, which augments the bidirectionally reflected light in the cavity to induce still further light emissive transitions. A rising pulse of bidirectionally reflected light quickly develops in the cavity, reaching a quantitatively large value as the induced emissive transition of molecules from the high energy level population increases. If one of the reflective cavity ends is partially transmissive, as is typically the case, a portion of the intense reflected light pulse passes through the one end and out of the cavity to constitute the laser output light pulse or the laser beam.

Stimulated light emission occurs only when the magnitude of the enlarged high energy level population established by the pumping light pulse exceeds the magnitude of the population of molecules remaining at the initial low energy level by a value determined by energy loss factors in the structure. The threshold condition for laser action is that at which the ratio of wave energy production to wave energy dissipation per wave energy cycle in the cavity becomes unity. The pumping light source should have an intensity sufficient to achieve this threshold. In order for stimulated emission to occur, the laser medium must be pumped with sufficient light energy to cause N* molecules of the dye solutions to become excited per second, wherein N* can be determined by the following equation:

$$N^*_a = (NJs + L/l)/[(Jg + Js) + kst^\tau t(J_8 - J_t)]$$

The terms for this equation are in general use in laser technology, and detailed descriptions for each appear, for example, in Webb, McColgin and Peterson, "Intersystem Crossing Rate and Triplet State Lifetime for a Lasing Dye," Journal of Chemical Physics, Vol. 53, No. 11, Dec. 1, 1970, p. 4227. In determining the value for N*, a significant allowance must often be made for those molecules which are inadvertently raised to an elevated triplet state from which non-radiative transition to the ground singlet state occurs. In organic dye liquid lasers, the formation of undesired triplet states can be partially restrained by controlling the duration of pumping radiation such that the absorbed energy is sufficient to produce excited singlets from which radiative transitions will occur, but insufficient to produce excited triplet states from which are generated non-radiative transitions. [See Sorokin, Lankard, Moruzzi and Hammond, "Flashlamp-Pumped Organic-Dye Lasers", *Journal of Chemical Physics*, v. 48, No. 10, p. 4726–41 (1968)].

The use of chemical triplet quenchers is also a means by which undesired triplet formation can be inhibited.

It is known that certain cyanine dyes are capable of lasing action. However, since these dyes are open chain polymethine dyes that are capable of existing in numerous stereoisomeric configurations, they are also capable of undergoing numerous rotational and translational modes of vibration. Cyanine dyes having such open-chain structures have not been generally regarded as desirable dye laser media. Their stability, especially in solution, is less than desirable given the conditions of elevated temperature, high ultraviolet light irradiation and the like that are imposed on organic dyes during the lasing operation. Additionally, open-chain cyanine dyes (including carbocyanines) generally exhibit low fluorescence efficiencies, a condition that tends to require high pumping energies in order to achieve stimulated emission. This is especially undesirable in view of their previously mentioned limited stability. Additionally, it is believed that the tendency of such openchain, non-rigidized cyanine dyes to shift between many rotational and translational modes of vibration fosters undesirable triplet formation. As such, it would be desirable to provide, for lasing operations, cyanine dyes that exhibit not only fewer degrees of rotational and vibrational freedom but also an increased fluorescence efficiency.

Accordingly, it is an object of this invention to provide novel liquid laser media.

It is another object of this invention to provide new liquid laser media including carbocyanine dyes.

Still another object of the present invention is to provide novel liquid laser media including rigidized carbocyanine dyes.

These and other objects of this invention will become additionally apparent from a reading of the specification and appended claims.

The objects of the present invention are accomplished with dye lasers having a reservoir means containing a laser dye solution and a pumping energy source capable of producing stimulated emission of the laser dye solution, the laser dye solution being a lasing concentration, in a non-interfering solvent, (i.e. one that does not inhibit stimulated emission-e.g. water, alkanols, etc.) of a rigidized carbocyanine dye including at least two nitrogen-containing heterocyclic nuclei, a polyene chain joining two of said nuclei and having five carbon atoms and an equal number of alternating single and double bonds, with three of the five carbon atoms intervening the two nuclei and a terminal carbon atom of the polyene chain being in each of the two heterocyclic nuclei and attached to a nitrogen atom thereof, and the remaining non-metallic atoms necessary to complete, in combination with the nitrogen atoms and the carbon atoms, a nucleus selected from 3,4,5a,6,7,8-hexahydro-4aH-pyrano[3,2-c;5,6-c']dipyridine and analogs thereof wherein the member in the 5-position is selected from either a sulfur atom, a selenium atom, or a nitrogen atom. Of those dyes wherein the member in the 5-position is a nitrogen atom, that nitrogen can be desirably substituted with a member selected from either a hydrogen atom, an alkyl radical having from 1 to 6 carbon atoms, a mono- or polycyclic aryl radical having from 6 to 10 atoms in the nucleus or an amino radical.

As used herein, the term lasing concentration refers to a concentration sufficient to promote, under appropriate conditions such as those mentioned herein, stimulated emission of the laser dye solution. Generally, concentrations of from about $10^{-1}$ to $10^{-5}$ molar are employed, with solutions of from $10^{-2}$ to $10^{-4}$ molar concentrations being preferred for maximum output energies. Still wider variations in concentration can be used for particular operations, if desired. The term rigidized carbocyanine dye refers to carbocyanine polymethine dyes wherein the methine carbon atoms and adjoining nitrogen atoms of terminal heterocyclic nuclei are integral to a fused ring system of which each ring nucleus preferably contains six member atoms.

Of the rigidized carbocyanine dyes useful in the dye lasers of this invention, advantageous dyes include those having the formula:

I.

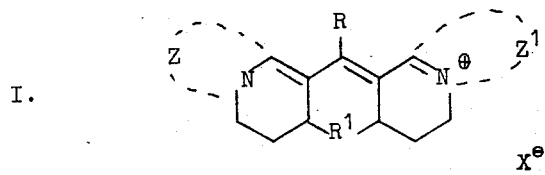

wherein:
a. each of Z and $Z^1$ represents the non-metallic atoms necessary to complete a heterocyclic nucleus of the type used in cyanine dyes,
b. R represents a member selected from either a hydrogen atom, an alkyl radical or an aryl radical,
c. $R^1$ represents a member selected from either an oxygen atom, a sulfur atom, a selenium atom or a nitrogen atom, and
d. $X^-$ represents an anion.

The non-metallic atoms represented by Z and $Z^1$ to complete a heterocyclic nucleus of the type used in the cyanine dyes include the non-metallic atoms necessary to complete a heterocyclic nucleus as in formula I above and having therein at least one hetero atom selected from either nitrogen, oxygen, sulfur or selenium. The heterocyclic nuclei completed by Z and $Z^1$ atoms also include those containing a heterocyclic ring of 5 to 6 nuclear atoms including the nitrogen atom and 4 or 5 additional atoms of which 3 or 4 atoms are carbon atoms and wherein the remaining additional atom is selected from either carbon, nitrogen, oxygen, sulfur or selenium atoms.

Exemplary heterocyclic nuclei of the type used in cyanine dyes and completed by the non-metallic Z and $Z^1$ atoms include, for example, those nuclei of the imidazole series such as benzimidazole compounds like 5-chlorobenzimidazole and also including compounds of the naphthimidazole series; those of the thiazole series like thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.; those of the benzothiazole series such as benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.; those of the naphthothiazole series like alpha-naphthothiazole, 8-methoxyalpha-naphthothiazole, 7-methoxy-alpha-naphthothiazole, etc.; those of the thionaphtheno-7',6',4,5-thiazole series such as 4-methoxythionaphtheno-7',6',4,5-thiazole, etc.; those of the oxazole series for example, 4-methyloxazole, 5-methyloxazole, 4-phenyloxazole, 4,5-diphenyloxazole, 4-ethyloxazole, 4,5-dimethyloxazole, 5-phenyloxazole, etc.; those of the benzoxazole series like benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.; those of the naphthoxazole series such as alpha-naphthoxazole, etc.; those of the selenazole series, for example, 4-methylselenazole, 4-phenylselenazole, etc., those of the benzoselenazole series like benzoselenazole, 5-chlorobenzoselenazole, 5-methoxybenzoselenazole, 5-hydroxybenzoselenazole, tetrahydrobenzoselenazole, etc; those of the naphthoselenazole series such as alpha-naphthoselenazole; and those of the 2-quinoline series such as quinoline, 4-methylquinoline, etc.

As defined herein, the term alkyl radical refers to straight and branched chain aliphatic radicals having from 1 to about 18 carbon atoms in the longest aliphatic chain (i.e., that chain which determines the radical nomenclature) such as methyl, ethyl, chloroethyl, propyl, isopropyl, n-butyl, isobutyl, tertbutyl, amyl, n-hexyl, n-heptyl, n-octyl, n-nonyl, n-decyl, dodecyl, tetradecyl, pentadecyl, heptadecyl, octadecyl and the like with alkyl radicals of from 1 to 8 carbon atoms being preferred. Aryl radicals are defined herein to include mono- and polycyclic aryl radicals having from 6 to 14 atoms in the nucleus, such as phenyl, p-tolyl, naphthyl, anthryl, and the like.

Heterocyclyl radicals advantageous herein include radicals having from 5 to about 14 atoms in a mono- or polycyclic nucleus and including in the nucleus at least one hetero atom such as nitrogen, sulfur, oxygen, selenium or the like.

Exemplary heterocyclyl radicals include such radicals as, for example, 5-chlorobenzimidazolyl, thiazolyl, 4-methylthiazolyl, benzothiazolyl, 4-chlorobenzothiazolyl, 5,6-dimethoxybenzothiazolyl, 5-hydroxybenzothiazolyl, as well as imidazolyl radicals including those of the benzimidazolyl and naphthimidazolyl series, thiazolyl radicals including those of the benzothiazolyl and naphthothiazolyl series, oxazolyl radicals including those of the benzoxazolyl and naphthoxazolyl series, selenazolyl radicals including those of the benzoselenazolyl and naphthoselenazolyl series, 2-quinolyl radicals such as 2-quinolyl, 4-methyl-2-quinolyl and the like. Additional useful heterocyclyl radicals are known to those skilled in the applicable arts.

The term amino radical as used herein refers to unsubstituted amino radicals and substituted amino radicals as well, with desirable substituents including alkyl, aryl and heterocyclyl radicals like those described elsewhere herein and additionally including substituents such as arylsulfonyl radicals like phenylsulfonyl and naphthylsulfonyl, acyl radicals like formyl, acetyl, propionyl, octadecanoyl, etc., and thiocarbamoyl radicals such as thiocarbamoyl, alkyl, dialkyl, aryl and alkylaryl thiocarbamoyl radicals wherein the alkyl and aryl moieties include alkyl and aryl radicals like those described herein.

The anions represented by X⁻ include a wide variety of anions like bromide, chloride and iodide, as well as additional anions, e.g., sulfates, including sulfate, hydrosulfate and lower alkyl sulfates like methylsulfate, aromatic sulfonates such as p-toluene sulfonate and benzene sulfonate, acid anions derived from carboxylic acids like acetate, trifluoroacetate, propionate, benzoate, and a wide variety of other anions including anions such as, for example, perchlorate, cyanate, thiocyanate, sulfamate, etc.

Especially advantageous rigidized carbocyanine dyes of the type described above in formula I include those wherein
a. R represents a member selected from either a hydrogen atom, an alkyl radical having from 1 to 6 carbon atoms, an aryl radical having from 6 to 10 atoms in a mono- or polycyclic nucleus, and
b. the nitrogen atom represented by $R^1$ is substituted with a member selected from either a hydrogen atom, an alkyl radical having from 1 to 6 carbon atoms, an aryl radical having from 6 to 10 atoms in a mono- or polycyclic nucleus and an amino radical.

Additional advantageous rigidized carbocyanine dyes of the present type include those having the formulas:

II. 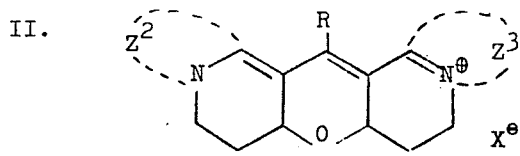

III. 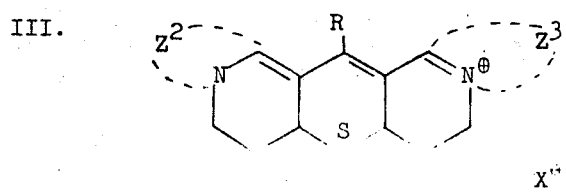

IV. 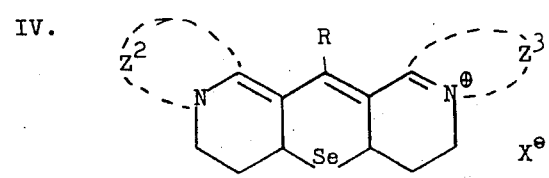

wherein:
a. each of $Z^2$ and $Z^3$ represents the atoms necessary to complete a heterocyclic nucleus containing a heterocyclic ring of 5 to 6 atoms including the nitrogen atom with the additional atoms of the heterocyclic ring being selected from either carbon, nitrogen, oxygen, sulfur or selenium,
b. R represents a member selected from either a hydrogen atom, an alkyl radical or an aryl radical, and X⁻ represents an anion such as those described herein.

Still additional advantageous rigidized carbocyanine dyes of the present type include those having the formula:

VI. 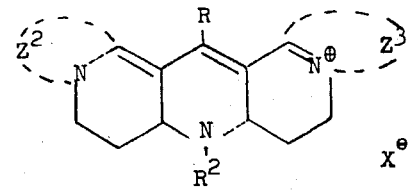

wherein:
a. each of $Z^2$, $Z^3$, R and X⁻ are as defined previously and
b. wherein $R^2$ represents a member selected from either a hydrogen atom, an alkyl radical having from 1 to 6 carbon atoms, an aryl radical having from 6 to 10 atoms in a mono- or polycyclic nucleus or an amino radical.

Included within the amino radicals represented by $R^2$ are amino radicals such as those having the formula

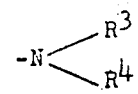

wherein:
a. $R^3$, when taken alone, represents a member selected from either a hydrogen atom, an alkyl radical having from 1 to 4 carbon atoms or a phenyl radical,
b. $R^4$, when taken alone, represents a member selected from either an alkyl radical having from 1 to 18 carbon atoms, a phenyl radical, a naphthyl radical, a heterocyclyl radical, an arylsulfonyl radical, an acyl radical, or a thiocarbamoyl radical, and
c. $R^3$ and $R^4$, when taken together, represent the nonmetallic atoms necessary to complete a heterocyclyl radical having from 5 to 13 atoms in a mono- or polycyclic nucleus.

Especially advantageous rigidized carbocyanine dyes of the types described herein include such compounds as:
a. 6,7,9,10-Tetrahydro-7aH,8aH-bisbenzothiazolo[3,2-a:3',2'-a']pyrano[3,2-c:5,6-c']dipyridin-5-ium iodide.
b. 6,7,9,10-Tetrahydro-17-ethyl-7aH,8aH-bisbenzothiazolo[3,2-a:3',2'-a']pyrano[3,2-c:5,6-c']dipyridin-5-ium bromide.
c. 6,7,9,10-Tetrahydro-3,13-dimethoxy-7aH,8aH-bisbenzothiazolo[3,2-a:3',2'-a']pyrano[3,2-c:5,6-c']dipyridin-5-ium iodide.
d. 6,7,9,10-Tetrahydro-17-ethyl-3,13-diphenyl-7aH,8aH-bisbenzoxazolo[3,2-a:3',2'-a']pyrano[3,2-c:5,6-c']dipyridin-5-ium bromide.
e. 2,3,13,14-Tetrachloro-16,18-diethyl-6,7,9,10-tetrahydro-7aH,8aH-bisbenzimidazolo[1,2-a:1',2'-a']pyrano[3,2-c:5,6-c']dipyridin-5-ium trifluoroacetate.
f. 5,6,8,9-Tetrahydro-3,11-diphenyl-6aH,7aH-bisthiazolo[3,2-a:3',2'-a']pyrano[3,2-c:5,6-c']dipyridin-4-ium bromide.

g. 14-Ethyl-5,6,8,9-tetrahydro-3,11-dimethyl-6aH,7aH-bisoxazolo[3,2-a:3',2'-a']pyrano[3,2-c:5,6-c']dipyridin-4-ium bromide.

h. 5,6,8,9-Tetrahydro-11-methyl-14-(1-naphthyl)-2-phenyl-6aH,7aH-oxazolo[3,2-a]selenazolo[3,2-a']pyrano[ 3,2-c:5,6-c']dipyridin-4-ium bromide.

i. 6,7,9,10-Tetrahydro-2,3,13,14-tetramethoxy-7aH,8aH-bisbenzothiazolo[3,2-a:3',2'-a']thiopyrano[3,2-c:5,6-c']dipyridin-5-ium bromide.

j. 3,13-Dichloro-6,7,9,10-tetrahydro-16,18-diphenyl-7aH,8aH-bisbenzimidazolo[1,2-a:1',2'-a']thiopyrano[3,2-c:5,6-c']dipyridin-5-ium bromide.

k. 6,7,9,10-Tetrahydro-3,13-dimethoxy-17-p-methoxyphenyl-7aH,8aH-bisbenzoxazolo[3,2-a:3',2'-a']thiopyrano[3,2-c:5,6-c']dipyridin-5-ium bromide.

l. 8,9,11,12-Tetrahydro-9aH,10aH-di-naphth [2,1:4,5:1,2;4',5-oxazolo 3,2-a]selenazolo[3,2-a]thiopyrano[3,2-c:5,6-c']dipyridin-7-ium bromide.

m. 5,6,8,9-Tetrahydro-2,3,12-trimethyl-16-propyl-6aH,7aH-benzoxazolo[3,2-a]oxazolo[3,2-a']thiopyrano[3,2-c:5,6-c']dipyridin-4-ium bromide.

n. 6,7,9,10-Tetrahydro-3,13-dimethyl-7aH,8aH-bisbenzoxazolo[3,2-a:3',2'-a']selenino[3,2-c:5,6-c']dipyridin-5-ium bromide.

o. 12-Chloro-16-ethyl-5,6,8,9-tetrahydro-2,3-diphenyl-6aH-7aH-benzothiazolo[3,2-a]thiazolo[3,2-a']selenino[3,2-c:5,6-c']dipyridin-4-ium bromide.

p. 3,13-Diethoxy-6,7,9,10-tetrahydro-17-methyl-7aH,8aH-bisbenzothiazolo[3,2-a:3',2'-a']selenino[3,2-c:5,6-c']dipyridin-5-ium bromide.

q. 8-(2-Benzothiazolylamino)-6,7,8,8a,9,10-hexahydro-7aH-bisbenzothiazolo[3,2-a:3',2'-a']pyrido[3,2-c:5,6-c']dipyridin-5-ium bromide.

r. 8-(2-Benzothiazolylamino)-6,7,8,8a,9,10-hexahydro-3,13-diphenyl-7aH-bisbenzoxazolo[3,2-a:3',2'-a']pyrido[3,2-c:5,6-c']dipyridin-5-ium bromide.

s. 2,3,13,14-Tetrachloro-16,18-diethyl-6,7,8,8a,9,10-hexahydro-7aH-bisbenzimidazolo[3,2-a:3',2'-a']pyrido[3,2-c:5,6-c']dipyridin-5-ium iodide.

t. 8-Phenyl-6,7,8,8a,9,10-hexahydro-7aH-diquino[1,2-a:1',2'-a']pyrido[3,2-c:5,6-c']dipyridin-5-ium iodide.

u. 8,17-Diethyl-6,7,8,8a,8,10-hexahydro-7aH-bisbenzothiazolo[3,2-a:3',2'-a']pyrido[3,2-c:5,6-c']dipyridin-5-ium iodide.

v. 3,13-Dichloro-8-(N-methyl-1-naphthylamino)-6,7,8,8a,9,10-hexahydro-7aH-bisbenzothiazolo[3,2-a:3',2'-a']pyrido[3,2-c:5,6-c']dipyridin-5-ium bromide.

w. 8-( N-methyloctadecylamino) -16,18-diphenyl-6,7,8,8a,9,10-hexahydro-7aH-bisbenzothiazolo[3,2-a:3',2'-a']pyrido[3,2-c:5,6-c']dipyridin-5-ium-p-toluenesulfonate.

x. 7-Diphenylamino-14-methyl-3,11-diphenyl-5,6,7,7a,8,9-hexahydro-6aH-bisthiazolo[3,2-a:3',2'-a']pyrido[3,2-c:5,6-c']dipyridin-4-ium bromide.

y. 8-(1,1-Dioxo-1,2-benzisothiazol-3-ylamino)6,7,8,8a,9,10-hexahydro-7aH-bisbenzothiazolo[3,2-a:3',2'-a']pyrido[3,2-c:5,6-c']dipyridin-5-ium iodide.

z. 6,7,8,8a,9,10-Hexahydro-8-p-toluenesulfonamido-7aH-bisbenzothiazolo[3,2-a,3',2'-a']pyrido[3,2-c:5,6-c']dipyridin-5-ium iodide.

aa. 6,7,8,8a,9,10-Hexahydro-8-thioureido-7aH-bisbenzothiazolo[3,2-a:3',2'-a']pyrido[3,2-c:5,6-c']dipyridin-5-ium iodide.

The rigidized carbocyanine dyes of this invention are derived from reactive cyclammonium quaternary salts, thhe preparation of which salts is comprehensively described in a Lincoln and Heseltine Belgian Patent 749,702 issued June 30, 1970. Their synthesis is conveniently effected by the reaction of a hydro salt of an alkyl heterocyclic base with an aliphatic organic compound having ethylenic unsaturation between the first and second carbon atoms. The reaction medium is advantageously an inert solvent that exhibits moderate polarity and dissolves both reagents, but which is not a solvent for the reaction product. Exemplary of such media are solvents like acetonitrile and dimethylacetamide. No reaction catalysts are generally required and the reaction temperature is conventionally variable from about 20°C. to about 30°C., although wider reaction temperatures can be employed, e.g., reflux conditions, as long as the reagents remain in solution and are not subjected to heating in excess of their decomposition temperatures. The reaction products precipitate from solution and can then be purified by such conventional means as solvent washes or crystallization. As a specific example, 3-(3,3-diethoxypropyl)-2-methyl-5-phenylbenzoxazolium bromide is prepared by reacting 2-methyl-5-phenylbenzoxazolium hydrobromide and acrolein diethylacetal in acetonitrile as a solvent. The reaction is carried out at about 25°C. and the reaction product is obtained as a precipitate.

Especially advantageous quaternary salts useful in preparing the rigidized dyes of this invention include those wherein the quaternary nitrogen atom is substituted with a 3,3-dialkoxypropyl substituent, such as the diethoxypropyl species noted above. These salts can be prepared by reacting an acrolein dialkylacetal with the hydro salt of an alkyl cyclammonium base and are desirable for preparation of rigidized dyes of the types described herein where $R^1$ represents an oxygen bridge. These dyes can also be derived from other salts wherein the quaternary nitrogen atom is substituted with a formylethyl radical. In the preparation of corresponding rigidized dyes wherein $R^1$ represents either sulfur or selenium, similar quaternary salts, but having either a sulfur atom or a selenium atom in lieu of the oxygen atom of an acetal or acyl radical, can be conveniently used. Still additional quaternary salts, useful in preparing rigidized dyes wherein $R^1$ represents a nitrogen atom, include salts corresponding to those described previously, but wherein the quaternary nitrogen atom is substituted with either an iminopropyl radical or a hydrazonopropyl radical in cases where, in the resultant rigidized dye, the $R^1$ nitrogen atom is substituted with an amino radical like those described elsewhere. Hydrazono- or iminopropyl quaternary salts can be obtained by reacting either the formylethyl or the dialkoxypropyl species with a hydrazine compound or an amine in an acid medium.

As an intermediate step in the preparation of the described rigidized carbocyanine dyes, cyclammonium quaternary salts having on the quaternary nitrogen atom one of the advantageous substituents noted hereinabove can be condensed by reacting the quaternary salt with the appropriate ortho ester, diethoxyethyl acetate, in a solvent medium to prepare non-rigidized carbocyanine dyes. By suitably substituting the ortho ester, the central or meso-carbon atom of the conjugated methine chain can be advantageously substituted with a variety of substituents, alkyl radicals and aryl radicals, for example, such as those described above as being represented by R. Symmetrical carbocyanine dye precursors prepared by such a condensation reaction are useful intermediates in preparing the subject rigidized carbocyanine dyes.

Symmetrical and non-symmetrical carbocyanine dye intermediates are conveniently prepared by reacting a quaternary salt such as those described hereinabove with a second such quaternary salt wherein the two-position is substituted with a member that can be a vinyl radical, itself substituted with either a halogen atom such as chlorine, an alkyl or aryl mercapto group (e.g., methylmercapto, ethylmercapto, phenylmercapto, etc.) and additionally with alkyl or aryl radicals such as those represented herein by R, or a member having the formula:

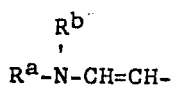

wherein $R^a$ represents an acyl radical, such as acetyl, propionyl, butyroyl, benzoyl, etc. (e.g., an acyl radical having from 2 to 7 carbon atoms) and $R^b$ represents either a hydrogen atom, an alkyl radical, an aryl radical, etc., such as those represented herein by R.

These reactions used to prepare the cyanine dye intermediates are advantageously accelerated by heating the reaction mixture, with temperatures varying from room temperature (about 25°C.) to the reflux temperature of the reaction mixture being satisfactory. The reactions can be carried out in the presence of an inert diluent such as nitrobenzene, methanol, n-propanol, butyrolactone, acetonitrile, chloroform, dimethylformamide, pyridine, acetic anhydride, dimethylacetamide, etc. After dye formation, the resultant product is typically obtained and purified by filtration and recrystallization from an inert diluent such as an alcohol like methanol or ethanol.

To prepare the completely rigidized carbocyanine dyes from the carbocyanine dye intermediates, a portion of the intermediate is admixed in a mild acid solution, such as one of acetic acid, and the mixture is heated, typically under reflux conditions whereupon the rigidized carbocyanine dye precipitates from solution in a form such as dye crystals. Alternatively, the rigidized dyes can be prepared at lower temperatures, but at equivalent rates, using stronger mineral acids, e.g., sulfuric acid. Conventionally, the resultant rigidized dye is collected by means of filter funnel, washed in an inert diluent such as an alcohol like methanol or ethanol and dried. Subsequent purification can be accomplished by washing, recrystallication or another conventional means.

In the case of hydrazonopropyl substituted carbocyanine dye intermediates, the intermediate carbocyanine dye can be prepared having dialkoxypropyl or formylethyl substituents attached to the chromophoric nitrogen atoms intervened by the polymethine chain. Thereafter, the appropriate amine or hydrazine can be included in the acid solution used for preparing the rigidized dye. During the heating step, a two-step reaction is effected, first forming the hydrazono- or imino-substituted open-chain dye which then ring closes to provide a rigidized carbocyanine dye of the present type.

The rigidized dye solutions used in the present dye lasers can be used, imploying conventional procedures, in any laser apparatus designed to employ liquid laser media, for example the apparatus of Sorokin, mentioned previously. Further reference to useful laser apparatus appears in an article by Sorokin, Lankard, Moruzzi and Hammond, "Flashlamp-Pumped Organic Dye Lasers," *Journal of Chemical Physics*, Vol. 48, No. 10, pages 4726–41 (1968).

It is generally accepted that among dyes of a particular class, e.g., carbocyanine dyes, those members having a higher fluorescence efficiency will be more susceptible of achieving stimulated emission under the proper conditions. Fluorescence efficiency is often meaningfully described in terms of fluorescence quantum yield. A quantum yield of 1.0 means that a quantum of fluorescent light is emitted for every quantum absorbed by the dye. Accordingly, the quantum yield is the ratio of emitted fluorescent light to absorbed light.

The following illustrative examples are included for a further understanding of the invention. The determination of fluorescence quantum yield is conveniently accomplished according to recognized procedures, such as that described in Costa, Grum and Paine, "Absolute Luminescence Spectra via Digital-Technique and Time-Resolved Spectroscopy," *Applied Optics*, Vol. 8, June 1969, p. 1149; J. G. Calvert and J. N. Pitts, Jr., "Photochemistry" John Wiley and Sons, New York, N.Y., 1966, pp. 799–804; or C. A. Parker, "Photoluminescence of Solutions," Elsevier Publishing Co., Amsterdam, Netherlands, 1968, pp. 262–268.

Example 1

8-(2-Benzothiazolylamino)-6,7,8,8a,9,10-hexahydro-7aH-bis-benzothiazolo[3,2-a;3',2'-a']pyrido[3,2-c:5,6-c']dipyridin-5-ium bromide

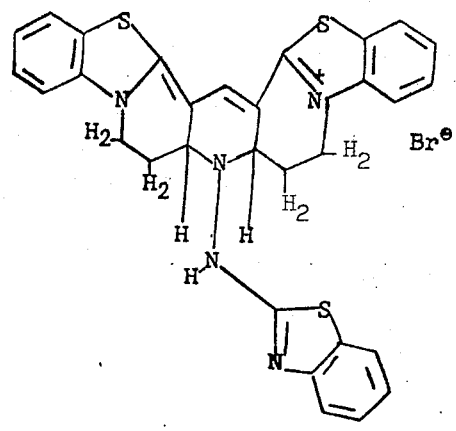

is prepared as follows: 3,3'-di[3-(2-benzothiazolylhydrazono)-propyl]thiacarbocyanine bromide (1 mol., 1.5 g.) is mixed in acetic acid (15 ml.) and the mixture is heated under reflux for 2 minutes.

A new dye crystallizes from a solution and collects on a filter funnel, is washed well with methyl alcohol, and dried. After refluxing in an excess of methyl alcohol and collecting again on a filter funnel, the yield of dye is 0.5 g. (42%) with a melting point of 270°–271°C. dec.

Example 2

A dye as in Example 1, but as the iodide salt, is prepared as follows: 3,3'-di-(3,3-diethoxypropyl)thiacarbocyanine iodide (1 mol., 2.16 g.) is mixed in acetic acid (30 ml.) 2-hydroazinobenzothiazole (2 mols., + 10% excess, 1.8 g.) is added and the mixture is heated under reflux 10 minutes. The reaction mixture is then cooled, the crystalline dye collected on a filter funnel, washed with acetone and dried. After two recrystallizations from methyl alcohol the yield of pure dye is 0.7 g. (33%), m.p. 291°–293°C. dec.

Example 3

8-(2-Benzothiazolylamino)-6,7,7a,8a,9,10-hexahydro-3,13-diphenyl-7aH-bisbenzoxazolo[3,2-a:3',2'-a']pyrido[3,2-c:5,6-c']dipyridin-5-ium bromide

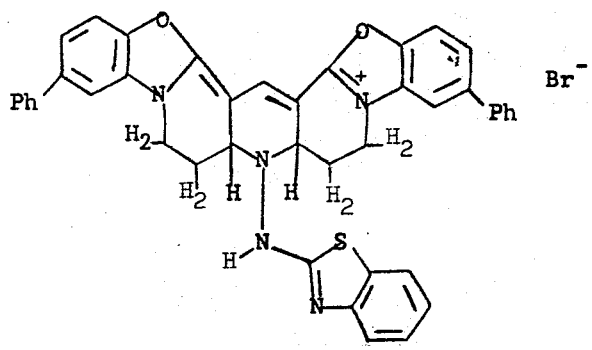

is prepared as follows: 3,3'-di-(3,3-diethoxypropyl-5,5'-diphenyloxacarbocyanine bromide (1 mol., 1.5 g.) is mixed in acetic acid (15 ml.), 2-hydrazinobenzothiazole (2 mols., 0.5 g.) is added and the mixture heated under reflux 4 minutes. The mixture is cooled, the crystalline dye collected on a filter funnel, washed with methyl alcohol and dried. After two recrystallizations from dimethylacetamide, the yield of pure dye is 0.5 g. (33%), m.p. 300°–301°C. dec.

Example 4

2,3,13,14-Tetrachloro-16,18-diethyl-6,7,8,8a,9,10-hexahydro-8-p-toluidino-7aH-bisbenzimidazo[3,2-a:3',2'-a']pyrido[3,2-c:5,6-c']-dipyridin-5-ium iodide

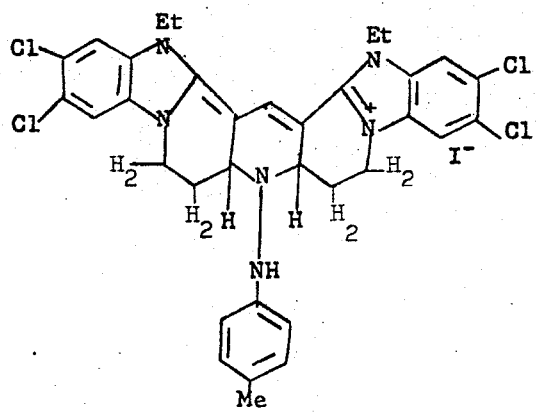

is prepared as follows: 5,6:5',6'-tetrachloro-3,3'-di(3,3-diethoxypropyl)-1,1'-diethylbenzimidazolocarbocyanine iodide (1 mol., 1.07 g.) is mixed in acetic acid (10 ml.), p-tolyl-hydrazine hydrochloride (2 mols. + 20% excess, 0.44 g.) is added and the mixture is heated under reflux for 2 minutes. The reaction mixture is cooled and the dye precipitated in the decolorized protonated form by adding ether (20 ml.) while stirring. The decolorized (protonated) dye is then collected on a filter funnel, placed in ethyl alcohol (10 ml.) and the dye de-protonated by adding 1,1,3,3-tetramethylguanidine (2 mols., 0.3 g.) with stirring. A white by-product precipitates from solution along with the dye. The dye and white solid are collected on a filter funnel, and the white solid is eliminated by washing the dye crystals on the filter with ethyl alcohol followed by acetone. After two recrystallizations from dimethylacetamide the yield of pure dye is 0.2 g. (21%), m.p. above 315°C.

Example 5

6,7,9,10-Tetrahydro-7aH,8aH-bisbenzothiazolo[3,2-a:3',2'-a']-pyrano[3,2-c:5,6-c']dipyridin-5-ium iodide

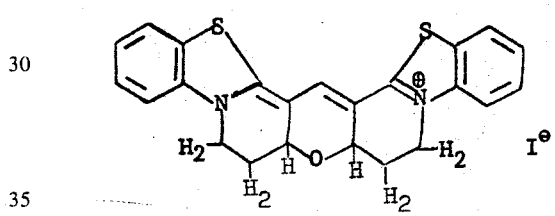

is prepared as follows: 3,3'-bis-(3,3-diethoxypropyl)-thiacarbocyanine iodide (1 mole, 3.5 g.) is mixed in water (8 ml.), with stirring, concentrated sulfuric acid (8 ml.) is added and the solution stirred at 22°C. for one-half hour. The solution is then chilled and stirred into acetone (500 ml.). At this point the acetone is decanted from the viscous residue and the dye is obtained as a solid by adding a solution of water (200 ml.) containing sodium iodide (2 g.). The solid dye is collected on a filter funnel, washed with water and dried. After refluxing in methyl alcohol (200 ml.) the yield of blue solid is 0.7 g. (27%), m.p. 308°–309°C. dec.

Example 6

6,7,9,10-Tetrahydro-17-ethyl-7aH,8aH-bisbenzothiazolo[3,2-a:3',2'-a']pyrano[3,2-c:5,6-c']dipyridin-5-ium bromide

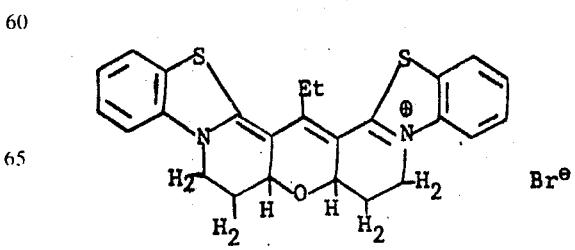

is prepared as follows: 3,3'-bis-(3,3-diethoxypropyl)-9-ethyl-thiacarbocyanine bromide (1 mole, 0.5 g.) is mixed in water (3 ml.) with stirring, concentrated sulfuric acid (2.5 ml.) is added slowly and the mixture is stirred at 22°C. for one-half hour. The mixture is then cooled and poured into acetone (125 ml.) after which triethylamine (15 ml.) is added with stirring and a blue viscous mass separates from solution. The mass is allowed to settle and the acetone is decanted. The dye is then obtained as a solid by adding water (50 ml.) containing sodium bromide (3 g.) to the viscous mass with stirring. The solid dye is collected on a filter funnel, washed with an excess of acetone and dried. The yield is 0.1 g. (26%), m.p. 250°–253°C. dec.

Example 7

6,7,9,10-Tetrahydro-3,13-dimethoxy-7aH,8aH-bisbenzothiazolo-[3,2-a:3',2'-a']pyrano[3,2-c:5,6-c']dipyridin-5-ium iodide

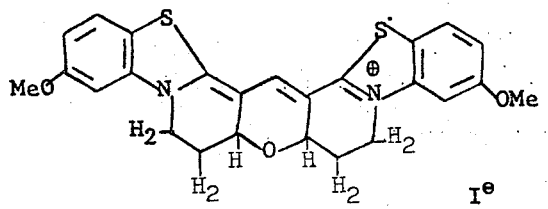

is prepared as follows: 3,3'-bis-(3,3-diethoxypropyl)-5,5'-diphenyl-9-ethyloxacarbocyanine bromide (1 mole, 1 g.) is mixed in water (4 ml.) with stirring, concentrated sulfuric acid (4 ml.) is added and the mixture is stirred at 22°C. for one-half hour. The solution is then poured into 250 ml. of acetone with stirring, triethylamine (15 ml.) is added and the dye separates from solution as a viscous mass. At this point, the acetone is decanted from the viscous mass and the dye is obtained as a solid by stirring with water (100 ml.) containing sodium bromide (4 g.). After recrystallization from methyl alcohol, the yield of pure dye is 0.1 g. (12.7%), m.p. 258°–262°C. dec.

Example 9

2,3,13,14-Tetrachloro-16,18-diethyl-6,7,9,10-tetrahydro-7aH,8aH-bisbenzimidazo[1,2-a:1',2'-a']pyrano[3,2-c:5,6-c']-dipyridin-5-ium trifluoroacetate

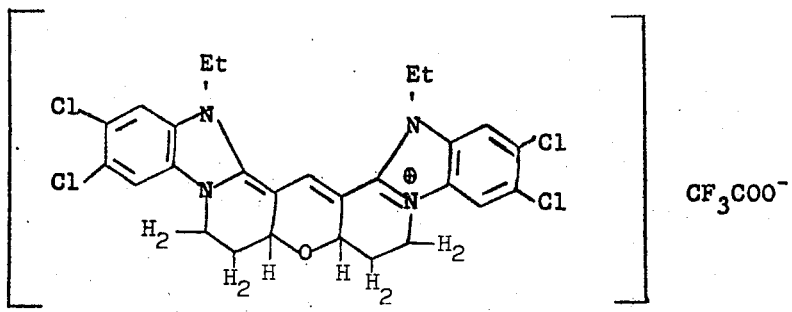

is prepared as follows: 3,3'-bis-(3,3-diethoxypropyl)-5,5'-dimethoxythiacarbocyanine iodide (1 mole, 2 g.) is stirred in water (5 ml.), concentrated sulfuric acid (5 ml.) is added and the entire mixture is allowed to stir at 22°C. for one-half hour. The mixture is then poured into acetone (600 ml.), triethylamine (25 ml.) is added with stirring and the dye separates as a viscous mass. The dye is obtained as a solid by decanting the acetone and stirring the viscous residue with water (200 ml.) containing sodium iodide (4 g.). The solid dye is collected washed with acetone and dried. After one recrystallization from ethyl alcohol, the yield of pure dye is 1 g. (71%), m.p. 300°–302°C. dec.

Example 8

6,7,9,10-Tetrahydro-17-ethyl-3,13-diphenyl-7aH,8aH-bisbenzoxazolo[3,2-a:3',2'-a']pyrano[3,2-c:5,6-c']dipyridin-5-ium bromide is prepared as follows: 5,6,5',6'-tetrachloro-3,3'-bis-(3,3-diethoxypropyl-1,1'-diethylbenzimidazolocarbocyanine iodide (1 mole, 2.1 g.) is wet with water (1.5 ml.) and concentrated sulfuric acid (6 ml.) is added with evolution of heat (iodine also evolves). The mixture temperature reaches 85°C. At this point the mixture is allowed to stir at 22°C. for one-half hour. The protonated mixture is poured into acetone (500 ml.) with stirring, triethylamine (15 ml.) is added and the dye separates from solution as a red solid. The solid dye is collected on a filter funnel, washed with acetone, then with water, again with acetone and dried. The yield of crude sulfate salt is 0.8 g. (40%). The dye as the sulfate salt is converted to the trifluoroacetate salt as follows. The sulfate salt (1 mole, 0.66 g.) is suspended in methyl alcohol (100 ml.) and trifluoroacetic acid (4 moles, 0.45 g.) is added with stirring, then propylene oxide (6 moles, 0.34 g.) is added and the entire mixture is stirred at 22°C. overnight. The solid dye is collected on a filter funnel, washed with acetone and dried. The yield of pure dye after two crystallizations from methyl alcohol is 0.3 g. (44%), m.p. 260°–261°C. dec.

Example 10

8-(1,1-Dioxido-3-[1,2]benzisothiazolylamino)-6,7,8,8a,9,10-hexahydro-7aH-bisbenzothiazolo[3,2-a:3'-a']pyrido[3,2-c:5,6-c']-dipyridin-5-ium iodide

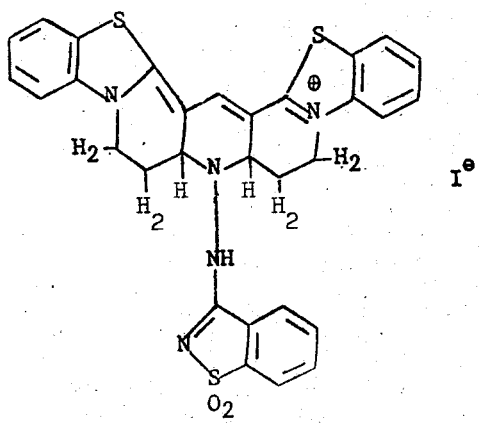

is prepared as follows: 3,3'-bis-(3,3-diethoxypropyl)-thiacarbocyanine iodide (1 mole, 0.8 g.) is mixed with 3-hydrazinobenzisothiazole-1,1-dioxide (2 moles, 0.28 g.) in acetic acid (10 ml.) and the mixture is heated under reflux for 10 minutes. The solid dye that separates from solution is collected on a filter funnel, washed with methanol and dried. After being refluxed twice in methanol (50 ml.), the solid is collected on a filter funnel and dried, m.p. 287°–290°C. dec.

Example 11

6,7,8,8a,9,10-Hexahydro-8-p-toluenesulfonamido-7aH-bisbenzothiazolo[3,2-a,3',2'-a']pyrido[3,2-c:5,6-c']dipyridin-5-ium iodide

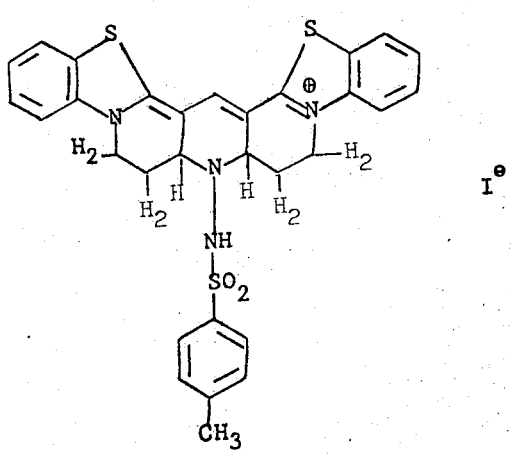

is prepared as follows: 3,3'-bis-(3,3-diethoxypropyl)-thiacarbocyanine (1 mole, 0.5 g.) is mixed with p-toluenesulfonhydrazide (2 moles, 0.26 g.) in acetic acid (10 ml.) and the mixture is heated under reflux for 10 minutes. The solid dye that separates from solution is collected on a filter funnel, washed with methanol and dried. After being refluxed in 2 portions of methanol (50 ml.) the yield of solid dye is 0.4 g. (51%), m.p. 335°–350°C. dec.

Example 12

6,7,8,8a,9,10-Hexahydro-8-thioureido-7aH-bisbenzothiazolo-[3,2-a:3',2'-a']pyrido[3,2-c:5,6-c']dipyridin-5-ium iodide

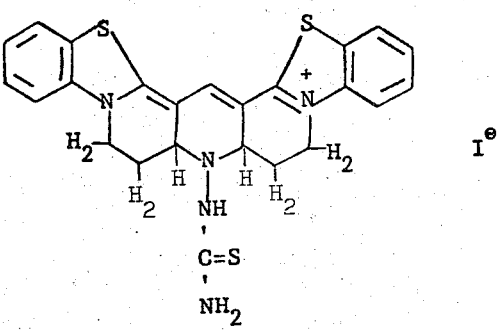

is prepared as follows: 3,3'-bis-(3,3-diethoxypropyl)-thiacarbocyanine iodide (1 mole, 0.5 g.) and thiosemicarbazide (1 mole, 0.13 g.) are mixed in acetic acid (5.5 ml.) and the mixture is heated under reflux 3 minutes. The solid dye that separates from solution is collected on a filter funnel, washed with acetic acid and dried. It is obtained essentially pure in 50% yield, m.p. 290°–293°C. dec.

Example 13

6,7,8,9a,9,10-Hexahydro-8-(4-oxo-2-thioxo-3-thiazolidinyl)-7aH-bisbenzothiazolo[3,2-a:3',2'-a']pyrido[3,2-c:5,6-c']-dipyridin-5-ium iodide

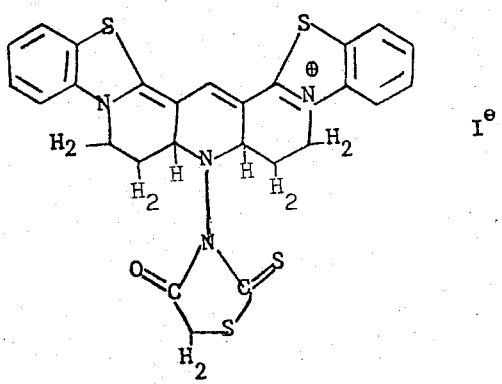

is prepared as follows: 3,3'-bis-(3,3-diethoxypropyl)-thiacarbocyanine iodide (1 mole, 1.0 g.) is mixed with 3-hydrazinorhodanine (2 moles, 0.4 g.) in acetic acid (10 ml.) and the mixture is heated under reflux for 10 minutes. The dye that separates from solution is collected on a filter funnel, washed with more acetic acid and dried. It is isolated essentially pure in 30% yield, m.p. 265°–267°C.dec.

Example 14

6,7,8,8a,9,10-Hexahydro-8-trimethylammonioacetamido-7aH-bisbenzothiazolo[3,2-a:3',2'-a']pyrido[3,2-c:5,6-c']dipyridin-5-ium iodide chloride

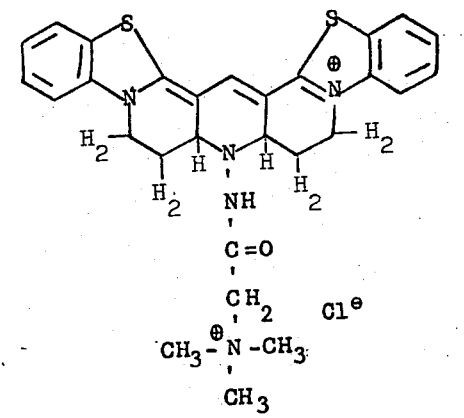

is prepared as follows: 3,3'-Bis-(3,3-diethoxypropyl)-thiacarbocyanine iodide (1 mole, 1.0 g.) and carbazoylmethyltrimethylammonium chloride (2 moles, 0.46 g.) are mixed in acetic acid (15 ml.) and the mixture is heated under reflux for 1 minute. The solid dye that separates from solution is collected on a filter funnel, washed with more acetic acid and dried. The yield of dye is 0.6 g. (61%), m.p. 246°–250°C. dec.

Example 15

Of known dyes that are highly fluorescent, fluorescein has a fluorescence quantum yield of 0.85 and Rhodamine B a yield of 0.70. By comparison, open-chain carbocyanines exhibit significantly lower yields as follows:

| DYE | FLUORESCENCE QUANTUM YIELD |
|---|---|
| a. 3,3'-Diethylthiacarbocyanine | 0.02 |
| b. 3,3'-Diethyl-5,5'-diphenyloxacarbocyanine iodide | 0.10 |
| c. 3,3'-Diethyl-9-methyl-5,5'-diphenyloxacarbocyanine bromide | 0.01 |
| and a partially rigidized carbocyanine dye has an even further diminished fluorescence efficiency | |
| d. 3,8;3',10-Diethylene-5,5'-diphenyloxacarbocyanine bromide | 0.005 |

In contradistinction to the previously described carbocyanine dyes, rigidized carbocyanine dyes of the type useful in the present invention are highly fluorescent. The dyes from the preceding Examples 1 and 3 to 14 are tested by the procedure referred to above. Fluorescence quantum yields for these dyes are presented in the following Table I. Where no quantitative quantum yield is specified, the designation F is used to indicate that the particular dye species is highly fluorescent.

TABLE I

| EXAMPLE NUMBER | DYE | FLUORESCENCE QUANTUM YIELD |
|---|---|---|
| 1 | 8-(2-Benzothiazolylamino)-6,7,8,8a,9,10-hexahydro-7aH-bisbenzothiazolo[3,2-a:3',2'-a']pyrido[3,2-c:5,6-c']dipyridin-5-ium bromide | 0.5 |
| 3 | 8-(2-Benzothiazolylamino)-6,7,7a,8a,9,10-hexahydro-3,13-diphenyl-7aH-bisbenzoxazolo[3,2-a:3',2'-a']pyrido[3,2-c:5,6-c']dipyridin-5-ium bromide | 0.8 |
| 4 | 2,3,13,14-Tetrachloro-16,18-diethyl-6,7,8,8a,9,10-hexahydro-9-p-toluidino-7aH-bisbenzimidazolo[3,2-a:3',2'-a']pyrido[3,2-c:5,6-c']dipyridin-5-ium iodide | F |
| 5 | 6,7,9,10-Tetrahydro-7aH,8aH-bisbenzothiazolo[3,2-a:3',2'-a']pyrano[3,2-c:5,6-c']dipyridin-5-ium iodide | 0.5 |
| 6 | 6,7,9,10-Tetrahydro-17-ethyl-7aH,8aH-bisbenzothiazolo[3,2-a:3',2'-a']pyrano[3,2-c:5,6-c']dipyridin-5-ium bromide | F |
| 7 | 6,7,9,10-Tetrahydro-3,13-dimethoxy-7aH,8aH-bisbenzothiazolo[3,2-a:3',2'-a']pyrano[3,2-c:5,6-c']dipyridin-5-ium iodide | 0.4 |
| 8 | 6,7,9,10-Tetrahydro-17-ethyl-3,13-diphenyl-7aH,8aH-bisbenzoxazolo[3,2-a:3',2'-a']pyrano[3,2-c:5,6-c']dipyridin-5-ium bromide | 0.8 |
| 9 | 2,3,13,14-Tetrachloro-16,18-diethyl-6,7,9,10-tetrahydro-7aH,8aH-bisbenzimidazolo[1,2-a:1',2'-a']pyrano[3,2-c:5,6-c']dipyridin-5-ium trifluoroacetate | F |
| 10 | 8-(1,1-Dioxo-1,2-benzisothiazol-3-ylamino)-6,7,8,8a,9,10-hexahydro-7aH-bisbenzothiazolo[3,2-a:3',2'-a']pyrido[3,2-c:5,6-c']dipyridin-5-ium iodide | F |

TABLE I—Continued

| EXAMPLE NUMBER | DYE | FLUORESCENCE QUANTUM YIELD |
|---|---|---|
| 11 | 6,7,8,8a,9,10-Hexahydro-8-p-toluenesulfonamido-7aH-bisbenzothiazolo[3,2-a:3',2'-a']pyrido-[3,2-c:5,6-c']dipyridin-5-ium iodide | F |
| 12 | 6,7,8,8a,9,10-Hexahydro-8-thioureido-7aH-bisbenzothiazolo[3,2-a:3',2'-a']pyrido[3,2-c:5,6-c']dipyridin-5-ium iodide | F |
| 13 | 6,7,8,8a,9,10-Hexahydro-8-(4-oxo-2-thioxo-3-thiazolidinyl)7aH-bisbenzothiazolo[3,2-a:3',2'-a']pyrido[3,2-c:5,6-c']dipyridin-5-ium iodide | F |
| 14 | 6,7,8,8a,9,10-Hexahydro-8-acetamido-7aH-bisbenzothiazolo[3,2-a:3',2'-a']pyrido[3,2-c:5,6-c']dipyridin-5-ium iodide chloride | F |

Example 16

A $10^{-4}$ molar solution of a rigidized carbocyanine dye of Example 1 (Dye A herein) is placed in the reservoir of a liquid laser apparatus as described in Example 1 of U.S. Pat. No. 3,521,187, using a coaxial flashlamp around an optically resonant lasing cavity. Energy for the lamp is stored by a 1 $\mu f$. capacitor. Excitation of the dye is also accomplished as described in Example 1 of U.S. Pat. No. 3,521,187. The results are tabulated below in Table II and the same procedure is carried out on various dyes as prepared according to the above Examples (B through K herein), those results also being tabulated in Table II.

TABLE II

| | DYE | Wavelength of Emission (+ 4 nm) | (Solvent) | Threshold Energy ($\times 10^3$ Joules) |
|---|---|---|---|---|
| A | 8-(2-Benzothiazolylamino)-6,7,8,8a,9,10-hexahydro-7aH-bisbenzothiazolo[3,2-a:3',2'-a']-pyrido[3,2-c:5,6-c']dipyridin-5-ium bromide | 598 | Methanol | .097 |
| B | 8-(2-Benzothiazolylamino)-6,7,7a,8a,9,10-hexahydro-3,13-diphenyl-7aH-bisbenzoxazolo-[3,2-a:3',2'-a']pyrido[3,2-c:5,6-c']dipyridin-5-ium bromide | 562 | Methanol | .27 |
| C | 2,3,13,14-Tetrachloro-16,18-diethyl-6,7,8,8a,9,10-hexahydro-8-p-toluidino-7aH-bisbenzimidazolo[3,2-a:3',2'-a']pyrido[3,2-c:5,6-c']dipyridin-5-ium iodide | 556 | Methanol | .67 |
| D | 6,7,9,10-Tetrahydro-7aH,8aH-bisbenzothiazolo-[3,2-a:3',2'-a']pyrano[3,2-c:5,6-c']dipyridin-5-ium iodide | 602 | Methanol | .19 |
| E | 6,7,9,10-Tetrahydro-3,13-dimethoxy-7aH,8aH-bisbenzothiazolo[3,2-a:3',2'-a']pyrano-[3,2-c:5,6-c']dipyridin-5-ium iodide | 657 | Methanol | .20 |
| F | 6,7,9,10-Tetrahydro-17-ethyl-3,13-diphenyl-7aH,8aH-bisbenzoxazolo[3,2-a:3',2'-a']-pyrano[3,2-c:5,6-c']dipyridin-5-ium bromide | 580 | Methanol | 1.4 |
| G | 2,3,13,14-Tetrachloro-16,18-diethyl-6,7,9,10-tetrahydro-7aH,8aH-bisbenzimidazolo[1,2-a:1',2'-a']-pyrano[3,2-c:5,6-c']dipyridin-5-ium trifluoroacetate | 549<br>557 | Methanol<br>Pyridine | .99 |
| H | 8-(1,1-Dioxo-1,2-benzisothiazol-3-ylamino)-6,7,8,8a,9,10-hexahydro-7aH-bisbenzothiazolo[3,2-a:3',2'-a']pyrido[3,2-c:5,6-c']dipyridin-5-ium iodide | 602<br>628 | Methanol | .75 |
| I | 6,7,8,8a,9,10-Hexahydro-8-p-toluenesulfonamido-7aH-bisbenzothiazolo[3,2-a:3',2'-a']pyrido-[3,2-c:5,6-c']dipyridin-5-ium iodide | 600 | Methanol | .20 |
| J | 6,7,8,8a,9,10-Hexahydro-8-thioureido-7aH-bisbenzothiazolo[3,2-a:3',2'-a']pyrido-3,2-c:5,6-c']dipyridin-5-ium iodide | 620<br>590 | Methanol | .16 |
| K | 6,7,8,8a,9,10-Hexahydro-8-(4-oxo-2-thioxo-3-thiazolidinyl)7aH-bisbenzothiazolo[3,2-a:3',2'-a']-pyrido[3,2-c:5,6-c']dipyridin-5-ium iodide | 601<br>629 | Methanol | .55 |

The above tabulated data indicate that these dyes lase at threshold energies that are extremely low for carbocyanines, thereby tending to obviate the problems occasioned by localized heating, i.e., dye decomposition and changes in refractive index. Additionally, it is perhaps significant that in the case of each of Dyes G, H, J and K, emissions are recorded at two wavelengths.

The invention has been described in detail with particular reference to certain preferred embodiments thereof, but it will be understood that variations and modifications can be effected within the spirit and scope of the invention.

We claim:

1. A method of producing coherent laser emission in the operation of a dye laser in the wavelength range of from about 500 to about 800 nm comprising the steps of optically pumping a dye solution to produce a population inversion in said solution and stimulating the emission of a beam of radiation therefrom, said solution containing about $10^{-2}$ to about $10^{-4}$ molar concentration of a lasing dye in a non-interfering solvent, said dye having a formula as follows:

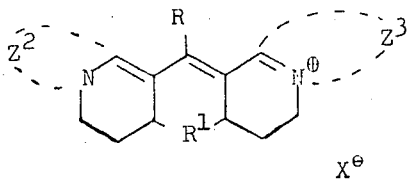

wherein:
  a. each of Z and $Z^1$ represents the non-metallic atoms necessary to complete a heterocyclic nucleus of the type used in cyanine dyes selected from the group consisting of an imidazole nucleus, a thiazole nucleus, a benzothiazole nucleus, a naphthothiazole nucleus, a thionaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, and a 2-quinoline nucleus,
  b. R represents a member selected from the group consisting of a hydrogen atom, an alkyl radical and an aryl radical,
  c. $R^1$ represents a member selected from the group consisting of an oxygen atom, a sulfur atom, a selenium atom and a N-$R^2$ group wherein $R^2$ represents a member selected from the group consisting of a hydrogen atom, an alkyl radical having from 1 to 6 carbon atoms, an aryl radical having from 6 to 10 atoms in a mono- or polycyclic nucleus and an amino radical, and,
  d. $X^-$ represents an anion.

2. A method of producing coherent laser emission in the operation of a dye laser in the wavelength range of from about 500 to about 800 nm comprising the steps of optically pumping a dye solution to produce a population inversion in said solution and stimulating the emission of a beam of radiation therefrom, said solution containing about $10^{-2}$ to about $10^{-4}$ molar concentration of a lasing dye in a non-interfering solvent, said dye having a formula as follows:

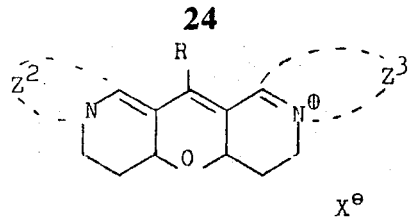

wherein:
  a. each of $Z^2$ and $Z^3$ represents the non-metallic atoms necessary to complete a heterocyclic nucleus of the type used in cyanine dyes selected from the group consisting of an imidazole nucleus, a thiazole nucleus, a benzothiazole nucleus, a naphthothiazole nucleus, a thionaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, and a 2-quinoline nucleus,
  b. R represents a member selected from the group consisting of a hydrogen atom, an alkyl radical and an aryl radical, and
  c. $X^-$ represents an anion.

3. A method of producing coherent laser emission in the operation of a dye laser in the wavelength range of from about 500 to about 800 nm comprising the steps of optically pumping a dye solution to produce a population inversion in said solution and stimulating the emission of a beam of radiation therefrom, said solution containing about $10^{-2}$ to about $10^{-4}$ molar concentration of a lasing dye in a non-interfering solvent, said dye having a formula as follows:

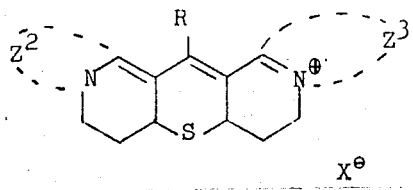

wherein:
  a. each of $Z^2$ and $Z^3$ represents the non-metallic atoms necessary to complete a heterocyclic nucleus of the type used in cyanine dyes selected from the group consisting of an imidazole nucleus, a thiazole nucleus, a benzothiazole nucleus, a naphthothiazole nucleus, a thionaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, and a 2-quinoline nucleus,
  b. R represents a member selected from the group consisting of a hydrogen atom, an alkyl radical and an aryl radical, and
  c. $X^-$ represents an anion.

4. A method of producing coherent laser emission in the operation of a dye laser in the wavelength range of from about 500 to about 800 nm comprising the steps of optically pumping a dye solution to produce a population inversion in said solution and stimulating the emission of a beam of radiation therefrom, said solution containing about $10^{-2}$ to about $10^{-4}$ molar concentration of a lasing dye in a non-interfering solvent, said dye having a formula as follows:

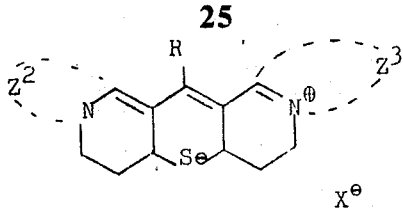

wherein:
a. each of $Z^2$ and $Z^3$ represents the non-metallic atoms necessary to complete a heterocyclic nucleus of the type used in cyanine dyes selected from the group consisting of an imidazole nucleus, a thiazole nucleus, a benzothiazole nucleus, a naphthothiazole nucleus, a thionaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, and a 2-quinoline nucleus,
b. R represents a member selected from the group consisting of a hydrogen atom, an alkyl radical and an aryl radical, and
c. $X^-$ represents an anion.

5. A method of producing coherent laser emission in the operation of a dye laser in the wavelength range of from about 500 to about 800 nm comprising the steps of optically pumping a dye solution to produce a population inversion in said solution and stimulating the emission of a beam of radiation therefrom, said solution containing about $10^{-2}$ to about $10^{-4}$ molar concentration of a lasing dye in a non-interfering solvent, said dye having a formula as follows:

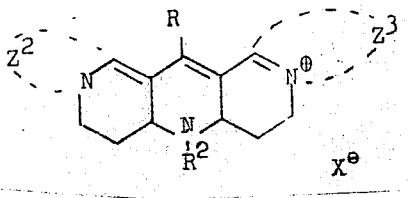

wherein:
a. each of $Z^2$ and $Z^3$ represents the non-metallic atoms necessary to complete a heterocyclic nucleus of the type used in cyanine dyes selected from the group consisting of an imidazole nucleus, a thiazole nucleus, a benzothiazole nucleus, a naphthothiazole nucleus, a thionaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, and a 2-quinoline nucleus,
b. R represents a member selected from the group consisting of a hydrogen atom, an alkyl radical and an aryl radical,
c. $R^2$ represents a member selected from the group consisting of a hydrogen atom, an alkyl radical having from 1 to 6 carbon atoms, an aryl radical having from 6 to 10 atoms in a mono- or polycyclic nucleus and an amino radical, and
d. $X^-$ represents an anion.

6. A method of producing coherent laser emission in operation of a dye laser in the wavelength range of from about 500 to about 800 nm comprising the steps of optically pumping a dye solution to produce a population inversion in said solution and stimulating the emission of a beam of radiation therefrom, said solution containing about $10^{-2}$ to about $10^{-4}$ molar concentration of a lasing dye in a non-interfering solvent, said dye selected from the group consisting of:

a. 6,7,9,10-Tetrahydro-7aH,8aH-bisbenzothiazolo-[3,2-a:3',2'-a']pyrano[3,2-c:5,6-c]dipyridin-5-ium iodide,
b. 6,7,9,10-Tetrahydro-17-ethyl-7aH,8aH-bisbenzothiazolo[3,2-a:3',2'-a']pyrano[3,2-c:5,6-c']-dipyridin-5-ium bromide,
c. 6,7,9,10-Tetrahydro-3,13-dimethoxy-7aH,8aH-bisbenzothiazolo[3,2-a:3',2'-a']pyrano[3,2-c:5,6-c']-dipyridin-5-ium iodide,
d. 6,7,9,10-Tetrahydro-17-ethyl-3,13-diphenyl-7aH,8aH-bisbenzoxazolo[3,2-a:3',2'-a']pyrano-[3,2-c:5,6-c']dipyridin-5-ium bromide,
e. 2,3,13,14-Tetrachloro-16,18-diethyl-6,7,9,10-tetrahydro-7aH,8aH-bisbenzimidazolo-[1,2-a:1',2'-a']pyrano[3,2-c:5,6-c']dipyridin-5-ium trifluoroacetate,
f. 5,6,8,9-Tetrahydro-3,11-diphenyl-6aH,7aH-bisthiazolo[3,2-a:3',2'-a']pyrano[3,2-c:5,6-c'-]-dipyridin-4-ium bromide,
g. 14-Ethyl-5,6,8,9-tetrahydro-3,11-dimethyl-6aH,-7aH-bisoxazolo-[3,2-a:3',2'-a']pyrano-[3,2-c:5,6-c']dipyridin-4-ium bromide,
h. 5,6,8,9-Tetrahydro-11-methyl-14-(1-naphthyl)-2-phenyl-6aH,7aH-oxazolo[3,2-a]selenazolo-[3,2-a']pyrano[3,2-c:5,6-c']dipyridin-4-ium bromide.
i. 6,7,9,10-Tetrahydro-2,3,-13,14-tetramethoxy-7aH,8aH-bisbenzothiazolo[3,2-a:3',2'-a]-thiopyrano[3,2-c:5,6-c']dipyridin-5-ium bromide,
j. 3,13-Dichloro-16,7,9,10-Tetrahydro-16,18-diphenyl-7aH,8aH-bisbenzimidazolo[1,2-a:1',2'-a']thiopyrano-[3,2-c:5,6-c']dipyridin-5-ium bromide,
k. 6,7,9,10-Tetrahydro-3,13-dimethoxy-17-p-methoxyphenyl-7aH,8aH-bisbenzoxazolo[3,2-a:3',2'-a']-thiopyrano[3,2-c:5,6-c']dipyridin-5-ium bromide,
l. 8,9,11,12-Tetrahydro-9aH,10aH-dinaphth-[2,1;4,5:1,2;4',5']oxazolo[3,2-a]selenazolo-[3',2'-a']thiopyrano[3,2-c:5,6-c']dipyridin-7-ium bromide.
m. 5,6,8,9-Tetrahydro-2,3,12-trimethyl-16-propyl-6aH,7aH-benzoxazolo[3,2-a]oxazolo[3,2-a']-thiopyrano[3,2-c:5,6-c']dipyridin-4-ium bromide,
n. 6,7,9,10-Tetrahydro-3,13-dimethyl-7aH,8aH-bisbenzoxazolo[3,2-a:3',2'-a']selenino-3,2-c:5,6-c']dipyridin-5-ium bromide,
o. 12-Chloro-16-ethyl-5,6,8,9-tetrahydro-2,3-diphenyl-6aH,7aH-benzothiazolo[3,2-a]thiazolo-[3,2-a']selenino[3,2-c:5,6-c']dipyridin-4-ium bromide,
p. 3,13-Diethoxy-6,7,9,10-tetrahydro-17-methyl--7aH,8aH-bisbenzothiazolo[3,2-a:3',2'-a']-selenino[3,2-c:5,6-c']dipyridin-5-ium bromide,
q. 8-(2-Benzothiazolylamino)-6,7,8,8a,9,10-hexahydro-7aH-bisbenzothiazolo[3,2-a:3',2'-a']pyrido[3,2-c:5,6-c']dipyridin-5-ium bromide,
r. 8-(2-Benzothiazolylamino)-6,7,8,8a,9,10-hexahydro-3,13-diphenyl-7aH-bisbenzoxazolo-[3,2-a:3',2'-a']pyrido[3,2-c:5,6-c']dipyridin-5-ium bromide,
s. 2,3,13,14-Tetrachloro-16,18-diethyl-6,7,8,8a,9,10-hexahydro-7aH-bisbenzimidazolo-[3,2-a:3',2'-a']pyrido[3,2-d:5,6-c']dipyridin-5-ium iodide,
t. 8-Phenyl-6,7,8,8a,9,10-hexahydro-7aH-diquino-[1,2-a:1',2'-a']pyrido[3,2-c:5,6-c']dipyridin-5-ium iodide,
u. 8,17-Diethyl-6,7,8,8a,9,10-hexahydro-7aH-bisbenzothiazolo[3,2-a:3',2'-a']pyride-[3,2-c:5,6-c']dipyridin-5-ium iodide,
v. 3,13-Dichloro-8-(N-methyl-1-naphthylamino)-6,7,8,8a,9,10-hexahydro-7aH-bisbenzothiazolo-[3,2-a:3',2'-a']pyrido[3,2-c:5,6-c']dipyridin-5-ium bromide,
w. 8-(N-Methyloctadecylamino)-16,18-diphenyl-6,7,-8,8a,9,10-hexahydro-7aH-bisbenzothiazolo-[3,2-a:3',2'-a']pyrido[3,2-c:5,6-c']dipyridin-5-ium-p-toluenesulfonate,
x. 7-Diphenylamino-14-methyl-3,11-diphenyl-5,6,7,-7a,8,9-hexahydro-6aH-bisthiazolo[3,2-a:3',2'-a']-pyrido[3,2-c:5,6-c']dipyridin-4-ium bromide,
y. 8-(1,1-Dioxo-1,2-benzisothiazol-3-ylamino)-6,7,8,8a,9,10-hexahydro-7aH-bisbenzothiazolo-[3,2-a:3',2'-a']pyrido[3,2-c:5,6-c']dipyridin-5-ium iodide,
z. 6,7,8,8a,9,10-Hexahydro-8-p-toluenesulfonamido-7aH-bisbenzothiazolo[3,2-a,3',2'-a']pyrido-[3,2-c:5,6-c']dipyridin-5-ium iodide,
aa. 6,7,8,8a,9,10-Hexahydro-8-thioureido-7aH-bisbenzothiazolo[3,2-a:3',2'-a']pyrido- -Continued
[3,2-c:5,6-c']dipyridin-5-ium iodide,
bb. 6,7,8,8a,9,10-Hexahydro-8-(4-oxo-2-thioxo-3-thiazolidinyl)-7aH-bisbenzothiazolo-[3,2-a:3',2'-a']pyrido[3,2-c:5,6-c']dipyridin-5-ium iodide, and cc. 6,7,8,8a,[8]9,10-Hexahydro-8-acetamido-7aH-bisbenzothiazolo[3,2-a:3',2'-a']pyrido-[3,2-c:5,6-a']dipyridin-5-ium-iodide chloride.

* * * * *

UNITED STATES PATENT AND TRADEMARK OFFICE
CERTIFICATE OF CORRECTION

PATENT NO. : 3,864,644

DATED : February 4, 1975

INVENTOR(S) : Lewis L. Lincoln and Donald W. Heseltine

It is certified that error appears in the above-identified patent and that said Letters Patent are hereby corrected as shown below:

Column 3, that part of formula "$J_8-J_t)]$" should read --$J_s-J_t)]$--.

Column 5, line 38, "to" should read --or--.

Column 10, line 3, "thht" should read --the--.

Columns 19 and 20 missing (Columns 15 and 16 repeated), Columns 19 and 20 should read as follows:

--more acetic acid and dried. It is isolated essentially pure in 30% yield, m.p. 265-267°C. dec.

Example 14

6,7,8,8a,9,10-Hexahydro-8-trimethylammonioacetamido-7aH-bisbenzothiazolo[3,2-a:3',2'-a']pyrido[3,2-c:5,6-c']dipyridin-5-ium iodide chloride

UNITED STATES PATENT AND TRADEMARK OFFICE
CERTIFICATE OF CORRECTION

PATENT NO. : 3,864,644          Page 2
DATED : February 4, 1975
INVENTOR(S) : Lewis L. Lincoln and Donald W. Heseltine It is certified that error appears in the above-identified patent and that said Letters Patent are hereby corrected as shown below:

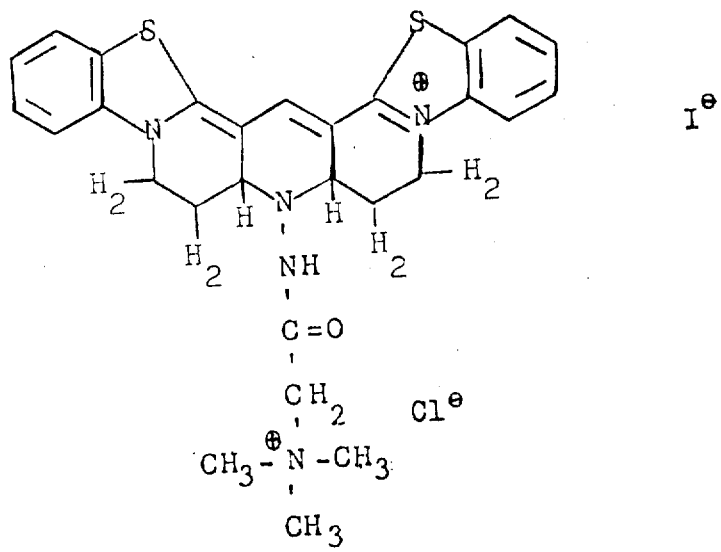

is prepared as follows: 3,3'-Bis-(3,3-diethoxypropyl)thiacarbocyanine iodide (1 mole, 1.0 g.) and carbazoylmethyltrimethylammonium chloride (2 moles, 0.46 g.) are mixed in acetic acid (15 ml.) and the mixture is heated under reflux for 1 minute. The solid dye that separates from solution is collected on a filter funnel, washed with more acetic acid and dried. The yield of dye is 0.6 g. (61%), m.p. 246-250°C. dec.

Example 15

Of known dyes that are highly fluorescent, fluorescein has a fluorescence quantum yield of 0.85 and Rhodamine B a yield of 0.70. By comparison, open-chain carbocyanines exhibit significantly lower yields as follows:

UNITED STATES PATENT AND TRADEMARK OFFICE
CERTIFICATE OF CORRECTION

PATENT NO. : 3,864,644                      Page 3

DATED : February 4, 1975

INVENTOR(S) : Lewis L. Lincoln and Donald W. Heseltine

It is certified that error appears in the above-identified patent and that said Letters Patent are hereby corrected as shown below:

| | DYE | FLUORESCENCE QUANTUM YIELD |
|---|---|---|
| a. | 3,3'-Diethylthiacarbocyanine | 0.02 |
| b. | 3,3'-Diethyl-5,5'-diphenyloxacarbocyanine iodide | 0.10 |
| c. | 3,3'-Diethyl-9-methyl-5,5'-diphenyloxacarbocyanine bromide | 0.01 | and a partially rigidized carbocyanine dye has an even further diminished fluorescence efficiency

| | | |
|---|---|---|
| d. | 3,8,3',10-Diethylene-5,5'-diphenyloxacarbocyanine bromide | 0.005 |

In contradistinction to the previously described carbocyanine dyes, rigidized carbocyanine dyes of the type useful in the present invention are highly fluorescent. The dyes from the preceding Examples 1 and 3 to 14 are tested by the procedure referred to above. Fluorescence quantum yields for these dyes are presented in the following Table I. Where no quantitative quantum yield is specified, the designation F is used to indicate that the particular dye species is highly fluorescent.

UNITED STATES PATENT AND TRADEMARK OFFICE
CERTIFICATE OF CORRECTION

PATENT NO. : 3,864,644      Page 4
DATED : February 4, 1975
INVENTOR(S) : Lewis L. Lincoln and Donald W. Heseltine It is certified that error appears in the above-identified patent and that said Letters Patent are hereby corrected as shown below:

TABLE I

| EXAMPLE NUMBER | DYE | FLUORESCENCE QUANTUM YIELD |
|---|---|---|
| 1 | 8-(2-Benzothiazolylamino(-6,7,8,8a,9,10-hexahydro-7aH-bisbenzothiazolo[3,2-a:3',2'-a']pyrido[3,2-c:5,6-c']dipyridin-5-ium bromide | 0.5 |
| 3 | 8-(2-Benzothiazolylamino)-6,7,7a,8a,9,10-hexahydro-3,13-diphenyl-7aH-bisbenzoxazolo-[3,2-a:3',2'-a']pyrido[3,2-c:5,6-c']dipyridin-5-ium bromide | 0.8 |
| 4 | 2,3,13,14-Tetrachloro-16,18-diethyl-6,7,8,-8a,9,10-hexahydro-9-p-toluidino-7aH-bisbenzimidazolo[3,2-a:3',2'-a']pyrido-[3,2-c:5,6-c']dipyridin-5-ium iodide | F |
| 5 | 6,7,9,10-Tetrahydro-7aH,8aH-bisbenzothiazolo[3,2-a:3',2'-a']pyrano[3,2-c:5,6-c']dipyridin-5-ium iodide | 0.5 |
| 6 | 6,7,9,10-Tetrahydro-17-ethyl-7aH,8aH-bisbenzothiazolo[3,2-a:3',2'-a']pyrano-[3,2-c:5,6-c']dipyridin-5-ium bromide | F |
| 7 | 6,7,9,10-Tetrahydro-3,13-dimethoxy-7aH,-8aH-bisbenzothiazolo[3,2-a:3',2'-a']-pyrano[3,2-c:5,6-c']dipyridin-5-ium iodide | 0.4 |

UNITED STATES PATENT AND TRADEMARK OFFICE
CERTIFICATE OF CORRECTION

PATENT NO. : 3,864,644   Page 5
DATED : February 4, 1975
INVENTOR(S) : Lewis L. Lincoln and Donald W. Heseltine It is certified that error appears in the above-identified patent and that said Letters Patent are hereby corrected as shown below:

| | | |
|---|---|---|
| 8 | 6,7,9,10-Tetrahydro-17-ethyl-3,13-diphenyl-7aH,8aH-bisbenzoxazolo-[3,2-a:3',2'-a']pyrano[3,2-c:5,6-c']-dipyridin-5-ium bromide | 0.8 |
| 9 | 2,3,13,14-Tetrachloro-16,18-diethyl-6,7,9,10-tetrahydro-7aH,8aH-bisbenzimidazolo[1,2-a:1',2'-a']pyrano-[3,2-c:5,6-c']dipyridin-5-ium trifluoroacetate | F |
| 10 | 8-(1,1-Dioxo-1,2-benzisothiazol-3-ylamino)-6,7,8,8a,9,10-hexahydro-7aH-bisbenzothiazolo-[3,2-a:3',2'-a']pyrido[3,2-c:5,6-c']dipyridin-5-ium iodide-- | F |

Column 23, line 65, after "containing", --between-- should be added.

UNITED STATES PATENT AND TRADEMARK OFFICE
CERTIFICATE OF CORRECTION

PATENT NO. : 3,864,644  
DATED : February 4, 1975  
INVENTOR(S) : Lewis L. Lincoln and Donald W. Heseltine Page 6

It is certified that error appears in the above-identified patent and that said Letters Patent are hereby corrected as shown below:

Column 24, line 65, after "containing" --between-- should be added.

Column 25, line 30, after "containing" --between-- should be added.

Column 25, line 62, after "in" --the-- should be added.

Column 28, line 3, "[3,2-c:5,6-a']" should read --[3,2-c:5,6-c']--.

Signed and Sealed this seventh Day of October 1975

[SEAL]

Attest:

RUTH C. MASON  
Attesting Officer

C. MARSHALL DANN  
Commissioner of Patents and Trademarks